United States Patent [19]

Yeo

[11] Patent Number: 5,864,366
[45] Date of Patent: Jan. 26, 1999

[54] SYSTEM AND METHOD FOR SELECTING VIDEO INFORMATION WITH INTENSITY DIFFERENCE

[75] Inventor: Boon-Lock Yeo, Yorktown Heights, N.Y.

[73] Assignee: International Business Machines Corporation, Armonk, N.Y.

[21] Appl. No.: 794,987

[22] Filed: Feb. 5, 1997

[51] Int. Cl.[6] .................................................. G06F 3/00
[52] U.S. Cl. ........................ 348/409; 348/700; 382/236; 345/320; 345/977; 345/349
[58] Field of Search .................................. 345/328, 348, 345/349, 977; 348/12, 13, 699, 700, 171, 415, 416, 409; 386/121; 382/103, 107, 172, 236

[56] References Cited

U.S. PATENT DOCUMENTS

| | | | |
|---|---|---|---|
| 5,420,637 | 5/1995 | Zeevi et al. ............................... | 348/409 |
| 5,576,950 | 11/1996 | Tonomura et al. ....................... | 386/121 |
| 5,642,294 | 6/1997 | Taniguchi et al. ....................... | 348/700 |
| 5,708,767 | 1/1998 | Yeo et al. ............................. | 345/328 X |
| 5,732,146 | 3/1998 | Yamada et al. .......................... | 382/107 |
| 5,751,838 | 5/1998 | Cox et al. .............................. | 382/107 |
| 5,767,922 | 6/1998 | Zabih et al. ............................ | 348/700 |
| 5,774,593 | 6/1998 | Zick et al. .............................. | 382/236 |

OTHER PUBLICATIONS

M. Mills, J. Cohen and Y.Y. Wong, "A Magnifier Tool for Video Data", Human Interface Group/Advanced Techology Apple Computer, Inc. Cupertino, CA., May 3–7, 1992, pp. 93–98.

B–L. Yeo and B. Liu, "On the Extraction of DC Sequence from MPEG Compressed Video", Information Sciences and Systems Dept. of Electrical Engineeering, Princeton U., Princdton, NJ 08544, Oct. 1995.

M.M. Yeung, B–L. Yeo, W. Wolf and B. Liu, "Video Browsing using Clustering and Scene Transitions on Compressed Sequences", Dept. of Electrical Engineering, Princeton U., Princeton, NJ, SPIE vol. 2417/399, May 1995.

H. Zhang, C.Y.Low and S.W.Smoliar, "Video Parsing and Browsing Using Compressed Data", Institute of Systems Science, National U. Singapore, ROS, pp. 89–111, 1995.

B–L. Yeo and B. Liu, "Rapid Scene Analysis on Compressed Video," IEEE Transactions on Circuits and Systems for Video Technology, vol. 5, No. 6, pp. 533–544.

*Primary Examiner*—John E. Breene
*Attorney, Agent, or Firm*—Louis J. Percello

[57] ABSTRACT

A system and method for browsing dynamic video information over a network includes selecting a small subset of frames from video shots and collections, using a threshold difference between two compared frames, to capture the dynamic content. Further selection and interleaving the selected frames within the shots and collections can be done to satisfy resource constraints like utilization of bandwidth. Interleaving is performed in storage and transmission of the frames to improve presentation of video information and to simultaneously display selected frames on a computer display to convey the dynamic of video. The system and method permit a dynamic summary of video information to be sent to a user over a network, while reducing resources (bandwidth) used by the network for the amount of information presented to the user.

20 Claims, 11 Drawing Sheets

SYSTEM AND METHOD FOR SELECTING VIDEO INFORMATION WITH INTENSITY DIFFERENCE

FIELD OF THE INVENTION

This invention relates to the field of video browsing. More specifically, the invention relates to a system and method for selecting and browsing video information with a display for viewing multiple dynamic segments of video information simultaneously.

BACKGROUND OF THE INVENTION

The ability to browse through a large amount of video material to find relevant clips of interest is extremely important in many video applications. In interactive TV and pay-per-view systems, customers like to see sections of programs before renting. In digital video library, it is important to provide functionality for users to quickly browse through results returned from queries and to navigate through large collections of materials. The sequential nature of video does not lend itself to easy searching and non-sequential random access operations, both of which are crucial to efficient and effective use of video material. In addition, while an entire video sequence can be transferred over a network to a client's computer for viewing, the inherently large datasize associated with video requires that a lot of bandwidth of the network and time be used for the transfer.

Video browsing is thus a method of displaying and presenting video in a simple and intuitive manner so that a user can easily go through large collection of video, as he would flip through books.

Two terms are defined here: a video shot and a video collection, which will be frequently used in this description:

A shot is a single sequence of video images, like a motion picture or a television program, recorded by one video capture medium without interruption. It is the most fundamental unit of video production.

A collection is a group of similar video shots, where similarity is defined in terms of visual characteristics. For example, in a news broadcast, a collection can be all the shots of a particular news anchor person.

Prior art displaying of video browsing include:

1. That of transferring the entire video, i.e., a video program, from a server to a client computer or loading the entire video from a local storage for sequential display on the computer display. The sequential display means one gets to see the video one frame after the other in specified sequence. Some display programs also provide VCR functions like fast-forward and fast-rewind.
2. That of using keyframes. There are two ways of doing this:
   2A. Dividing the video into equal length segments, and for each segment, choosing one frame, say the first, for display. If there are N segments, then there are N keyframes being displayed. Examples of this are disclosed in Mills et al. (M. Mills and J. Cohen and Y. Y. Wong, "A magnifier tool for video data," in Proceedings of ACM Computer Human Interface (CHI), pp.93–98, May 1992).
   2B. Dividing the video into shots. For each shot, choosing one or more keyframes, for display. Example work is that of Zhang at el. (H. J. Zhang and C. Y. Low and S. W. Smoliar, "Video Parsing and Browsing using Compressed Data", Multimedia Tools and Applications, pp. 89–111, March 1995). Different numbers of keyframes are selected for each shot based on the activities in the shot. Many keyframes will be selected for shots with significant temporal activities, and few for shots with static contents.
3. That of using graph-based presentation, as disclosed in the work of Yeung et al., M. M. Yeung, B. L. Yeo, W. Wolf, and B. Liu, "Video browsing using clustering and scene transitions on compressed sequences," in Multimedia Computing and Networking 1995, vol. SPIE 2417, pp. 399–413, Feb. 1995). In this presentation, an image icon represents a collection of similar video shots and a directed edge represents the flow of temporal information.

These references are incorporated by reference in their entirety.

STATEMENT OF PROBLEMS WITH THE PRIOR ART

The prior art discussed above relates only to the display and presentation of video. No consideration is given to the transmission aspect of sending the information over a network environment. Thus, no consideration to the bandwidth requirement versus the amount of information sent per unit time is made.

Some prior art requires that an entire multimedia shot be downloaded to a client. This takes a long time and requires a user to view the data sequentially.

Other prior art, sends one or more static images to a client, but the client does not see any dynamic content of the shot. Each of the images fail to convey the dynamic information of the video content. For example, sending the first frame of a shot of a touchdown sequence does not present the excitement conveyed by the dynamics of this shot.

OBJECTS OF THE INVENTION

An object of this invention is an improved system and method for providing a dynamic summary of video information to a user.

An object of this invention is an improved system and method for providing a dynamic summary of video information to a user over a network.

An object of this invention is an improved system and method for selecting a small subset of frames from video shots and video collections.

An object of this invention is an improved system and method for providing a dynamic summary of video information by simultaneously displaying a multiple collection of the information to a user.

An object of this invention is an improved system and method for providing a dynamic summary of video information to a user over a network to reduce bandwidth used by the network while increasing the amount of information presented to the user.

SUMMARY OF THE INVENTION

The invention provides an improved system and method for selecting and browsing video information. Because of the inherent large data size associated with video data, it is impractical to send every single frame of a shot/collection over a network for browsing. Even sending one or more static images has its limitation in that the dynamic of video cannot be conveyed through static images. In a preferred embodiment of this invention, selection of frames for shots and collections is performed to minimize the amount of information sent over a network. A subset of frames is selected using a threshold criteria (e.g. an intensity difference between compared frames) so that the frames in this subset capture the contents and dynamics of the shots and collections because each adjacent pair of frames in the subset have approximately the same difference in contents/dynamics/motion (as measured in intensity) as any other adjacent pair of frames. The total number of frames in the subset can also be further constrained.

In another embodiment of this invention, the frames in the subset can also be interleaved such that frames that are further apart in time are transmitted first, thereby allowing a user at a client to see the overall dynamic of video shots and collections before seeing the more detailed dynamic of video shots.

In yet another embodiment of this invention, a dynamic summary of video information is provided at a computer display through a simultaneously display of multiple collections of video frames selected by method in this invention. The selection and interleaving of frames in shots and collections, and the display of these frames through simultaneous display permit a dynamic summary of video information to be presented to a user over a network. The bandwidth used by the network is reduced for the amount of information presented to the user.

BRIEF DESCRIPTION OF THE DRAWINGS

The foregoing and other objects, aspects and advantages will be better understood from the following detailed description of preferred embodiments of the invention with reference to the following drawings:

FIG. 2 (a) is a block diagram of one preferred display showing two or more icons dynamically playing the content of several multimedia collections, each collection consisting of several multimedia shots.

FIG. 2 (b) and 2 (c) show alternative embodiments of displaying icons.

FIG. 4 (a) is a flow chart of a selection process of frames executing at a workstation or on a network server.

FIG. 4 (b) is a flow chart of a further selection process of frames.

FIG. 4 (c) shows an analogy of the further selection process in one dimension.

FIG. 4 (d) shows a result from a further selection process.

FIG. 4 (e) shows a result from an interleaving of selected frames.

FIG. 6 (a) is a block diagram of one preferred network packet that is transmitted over the network by the server.

FIG. 6 (b) shows a preferred order of transmitting frames in a collection.

DETAILED DESCRIPTION OF THE INVENTION

Figure 1:
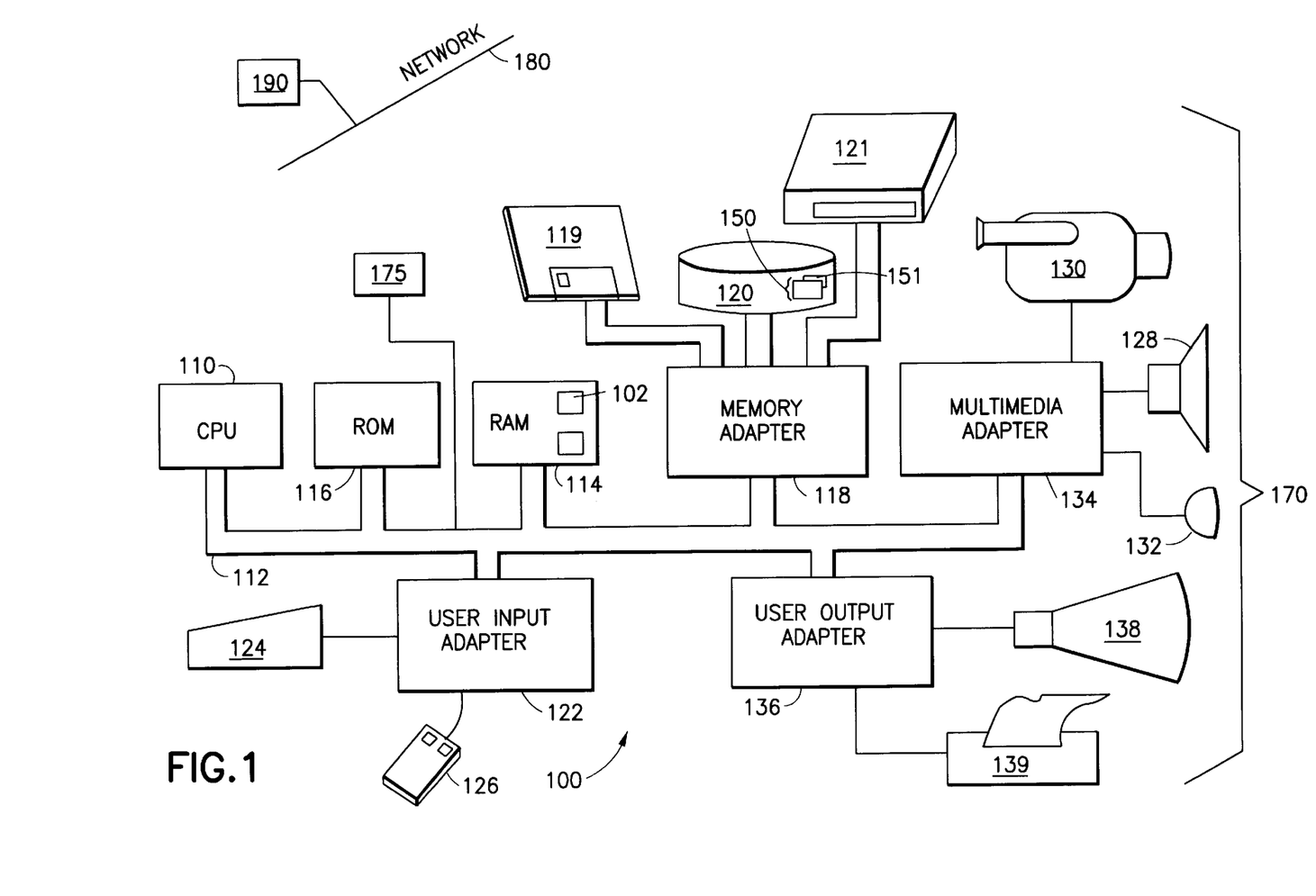
FIG. 1 is a block diagram example of a stand alone computer system or a client/server computer system that embodies the present invention.

Referring first to FIG. 1, a block diagram is shown as a non limiting example of a computer system 100, e.g., a RISC System/6000 or an IBM ThinkPad Model 775CX. (RISC System/6000 and ThinkPad are trademarks of the IBM Corporation.) The computer system 100 can be a stand alone computer 170 or a client 170 connected to one or more servers 190 over a network 180. It is readily understood that those skilled in the computer arts will be familiar with many equivalent computer systems 100. Components in the computer system 100 are connected by and communicate over a system bus 112. A central Processing Unit (CPU) 110, Read Only Memory (ROM) 116, and Random Access Memory (RAM) 114, typically are connected to the system bus 112. The preferred embodiment includes one or more application programs 102. Examples of application programs 102 are processes 400 and 406, described below. Additional memory, e.g., diskettes 119, disks 120, and CDROM 121, can be connected to the system bus 112 by appropriate memory adaptors 118. Input/output adaptors (122, 136) connect the system bus 112 to devices that interact with a user. For example, a keyboard 124 and/or mouse 126 input are connected to the system bus 112 through an appropriate user input adapter 122, just as a display (e.g. a Graphical User Interface, GUI) 138 and/or printer 139 are connected to the system bus 112 through an appropriate User Output Adapter 136. For example, a User Output Adapter 136 used to control a GUI would be an IBM RISC System/6000 Color Graphics Display Adaptor 136. Multimedia functions optionally can be added to the system 100 by using an appropriate Multimedia Adapter 134 like the ActionMedia II Display Adapter 134 (described in the IBM ActionMedia II Technical Reference.) Adapters 134 like this are used to input and output audio signals through audio input devices (e.g. a microphone ) 132 and audio output devices (e.g. one or more loud speakers) 128. Video input (e.g. through a camera) 130 and video output 138 is also enabled by adaptors like these. Speech recognition is accomplished by using an IBM VoiceType Dictation Adapter 134. User interfaces (122, 136) for other functions, e.g., virtual reality systems, can be connected to the system bus 112. The system 100 can be connected to local or wide area networks 180 (e.g., the Internet) through an appropriate network interface 175. For an example of communications over a network, see U.S. Pat. No. 5,371,852 to Attanasio et al., issued on Dec. 6, 1994 which is herein incorporated by reference in its entirety.

Figure 2A:
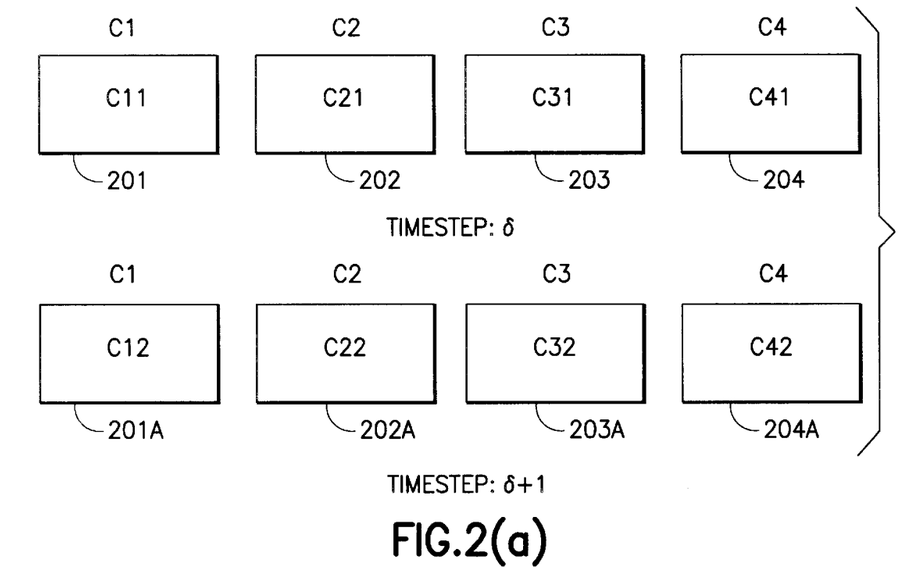

FIG. 2 (a) depicts a display showing two or more icons, each dynamically playing the content of several multimedia collections (e.g. C1, C2, C3, and C4) in two different timesteps, $\delta$ and $\delta+1$. In FIG. 2(a), icons (201–204 and 201A–204A) are shown at two points in time (time steps) for each of the collections (C1, C2, C3, and C4). For example, at time step $\delta$, icons 201, 202, 203 and 204 display frames C11, C21, C31 and C41 for collections C1, C2, C3, and C4, respectively. At the next time step $\delta+1$, the same icons then display frame C12, C22, C32 and C42 for collections C1, C2, C3, and C4, respectively. In FIG. 2(a), each of the frames of a collection C1 is denoted by C11, C12, C13 (not shown), . . .

Figure 2B:
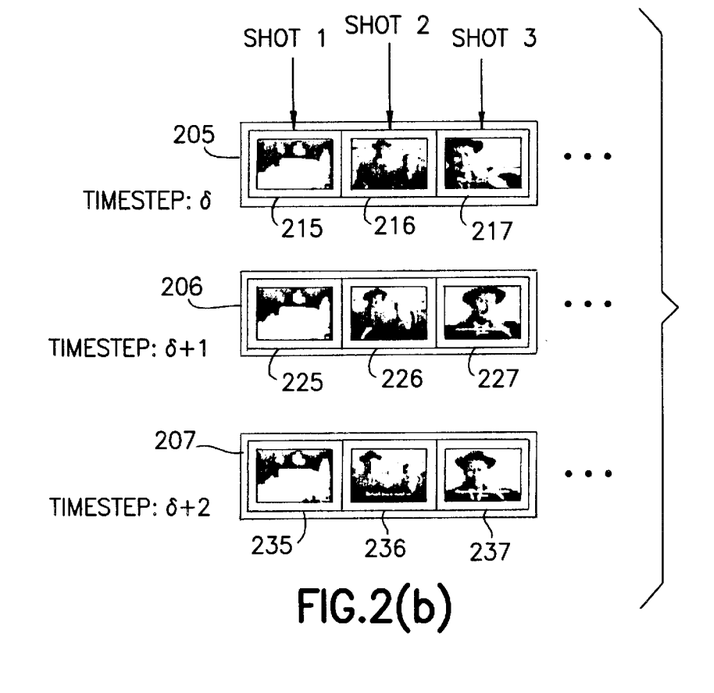
Figure 4A:
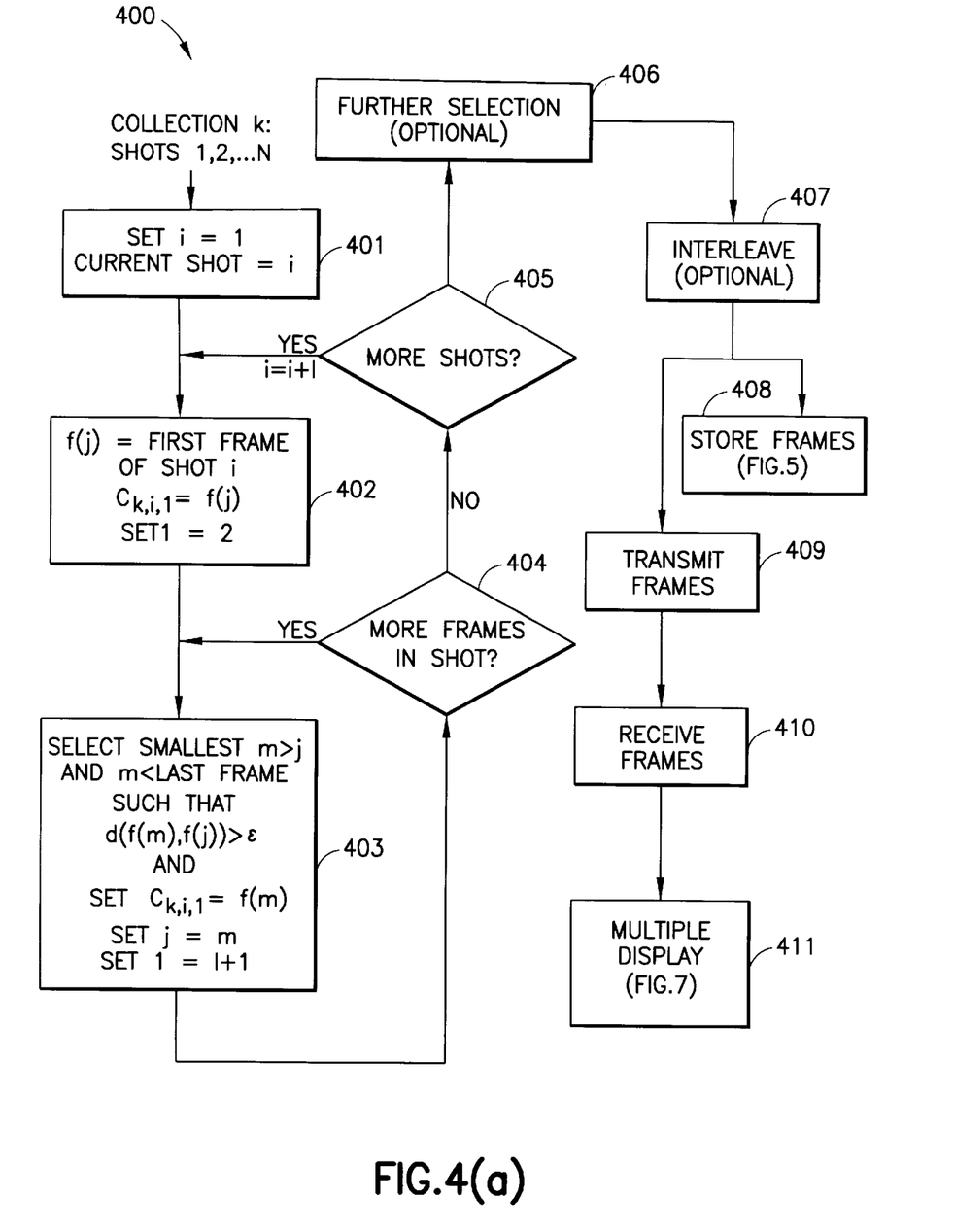

FIG. 2 (b) shows a non limiting example of the results of using the invention to dynamically display the content of shots of a 30-second IBM commercial "France". In this example, the content of the first three shots are shown. Shot 1 is represented by frames 215, 225, and 235; shot 2 is represented by frames 216, 226 and 236; shot 3 is represented by frames 217, 227 and 237. At each time step, one frame is used to represent its respective shot. In this example, at the first time step $\delta$, 205 depicts 215, 216 and 217 as representation of one frame of each of the respective three shots (shots 1, 2, and 3) simultaneously being displayed at a first time; at the second time step δ+1, 206 depicts 225, 226 and 227 as representation of one frame of each of the respective three shots simultaneously being displayed at a second time; at the third time step δ+2, 207 depicts 235, 236 and 237 as representation of one frame of each of the respective three shots simultaneously being displayed at a third time. Each of the frames representing each shot differ from the previous frame of their respective shot by some threshold (i.e., a threshold based on intensity as defined below, in FIG. 4 (a)).

In an alternative embodiment, the δ's or time steps for each of the shots (e.g. shots 1, 2, and 3) may not be equivalent. For example, shot 1 may update frame 215 to frame 225 in a one second time step, while shot 2 may update frame 216 to frame 226 in a 1.5 second time step.

Note that the frames (e.g. 215, 225, and 235) of a shot (e.g., shot 1) are a selected "subset" of frames of the entire shot. The selection criteria is that all of the frames in the subset vary in intensity from an adjacent frame (i.e., adjacent in time) by approximately the same intensity difference, i.e. the threshold ε defined below.

In this example, by seeing only the frames in 205, 206 and 207, (i.e. the subset of frames at each given time step) at the their respective time steps (δ, δ+1 and δ+2), the user not only can see at a glance the essence of the 30-second commercial, but also can get a feel of the dynamics of each shot. The subset of frames selected for each shot is selected by a selection process described in FIG. 4 (a), below. Because the frames of the subsets are are different from each other by a certain threshold, the dynamics of the program are preserved while showing to the user a smaller number of frames (subset) of the shot.

Because the selection process discards much of the information in the program, there is a substantial reduction in bandwidth consumption/storage as compared to transmitting/storing every single frame of the shot/collection. Because the selection process 400 only retains the frames/shots that allow the user to get a quick overall glance of the video content and the dynamics of its content, the invention can be used to save transmission bandwidth and time, memory storage, and user viewing time.

In various preferred embodiments, the amount of information, i.e., frames and/or shots that are selected can be controlled in one or more modes. For instance, the amount of information that is selected can be controlled by the user or limited by bandwidth availability and/or other system resources (memory, display speed, etc.). (In this descriptions these limitations of the system will also be called resource limitations.) Where there are these resource limitations, the number of frames in the subset can be further reduced by selecting a second subset from the subset. See below.

In an alternative embodiment, the subsets, elements of the subset, or elements of two or more subsets, can be transmitted one at a time or upon user request. For example, in an initial transmission, only those frames making up 205 are transmitted (e.g. elements/frames of two or more subsets). As more bandwidth becomes available or when there is a lack of (or a positive) user's response, 206 and/or 207 can be further transmitted to the client's computer. As a consequence, a user gets to see those frames making 205 initially, thus getting a quick overview of the content, and then later also gets to see the frames of 206 and/or 207, thus getting a sense of the dynamic of the content. All this happens without the need for transmitting every single frame, thereby saving considerably on bandwidth consumption. Alternatively, only the subset of shot 1 (then later subsequent shots) would be sent using the time steps.

Figure 2C:
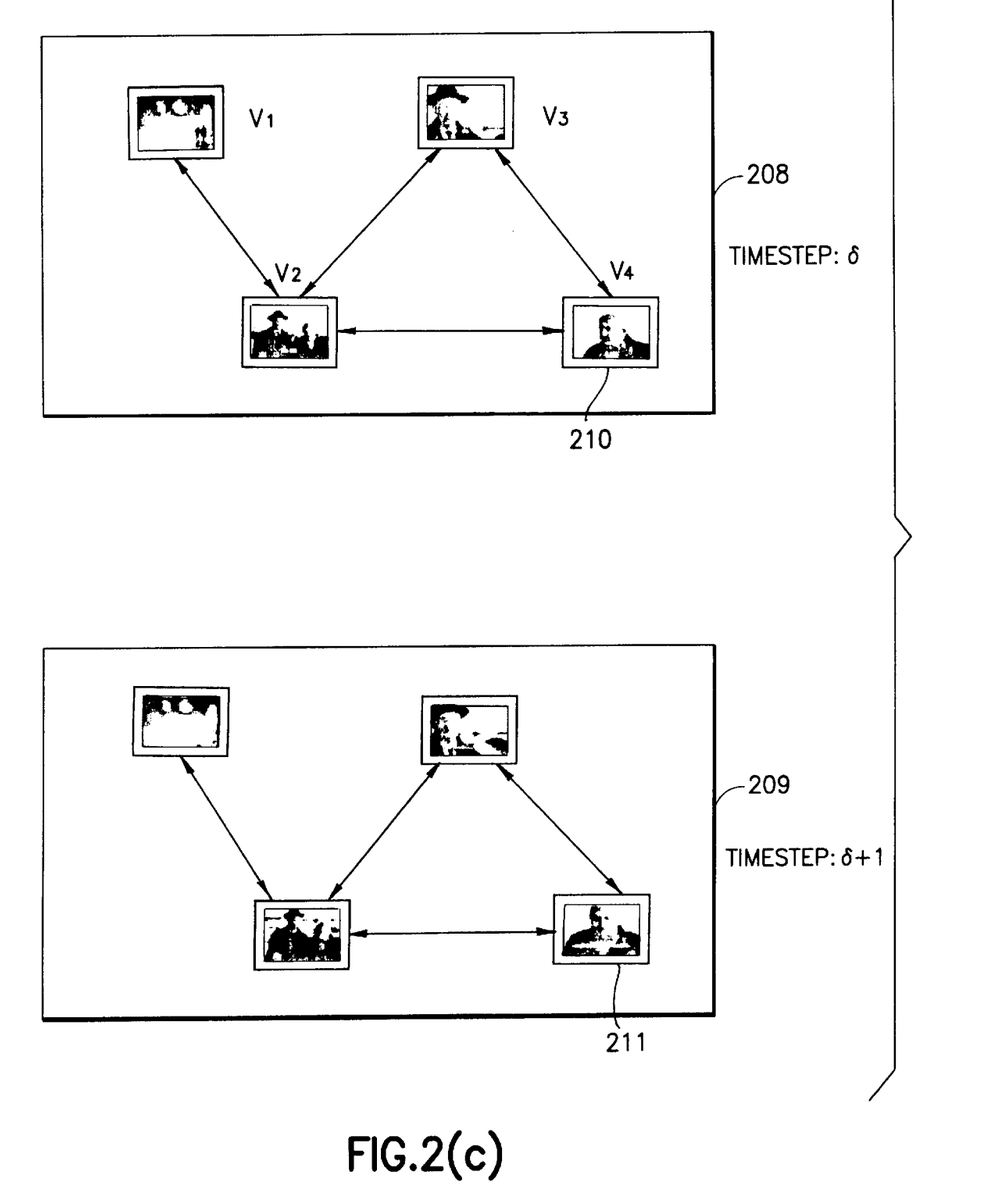

FIG. 2(c) shows the results of another non-limiting example of the results of using the invention to dynamically display multimedia content of a video. Here, the presentation uses a Scene Transition Graph (M. M. Yeung, B. L. Yeo, W. Wolf, and B. Liu, "Video browsing using clustering and scene transitions on compressed sequences," in Multimedia Computing and Networking 1995, vol. SPIE 2417, pp. 399–413, Feb. 1995 (incorporated above).

In FIG. 2(c), there are 4 nodes (V1–V4) per graph (208,209). Graph 208 depicts 4 image icons, each icon selected from and representing a collection, which in this case is a cluster of similar shots. Node 210 (V4) in 208 is a cluster of similar shots of a character in this commercial. Animation at each of the nodes can be added easily by using this invention because the invention selects a small subset of frames that can be played at each of the nodes.

Figure 3:
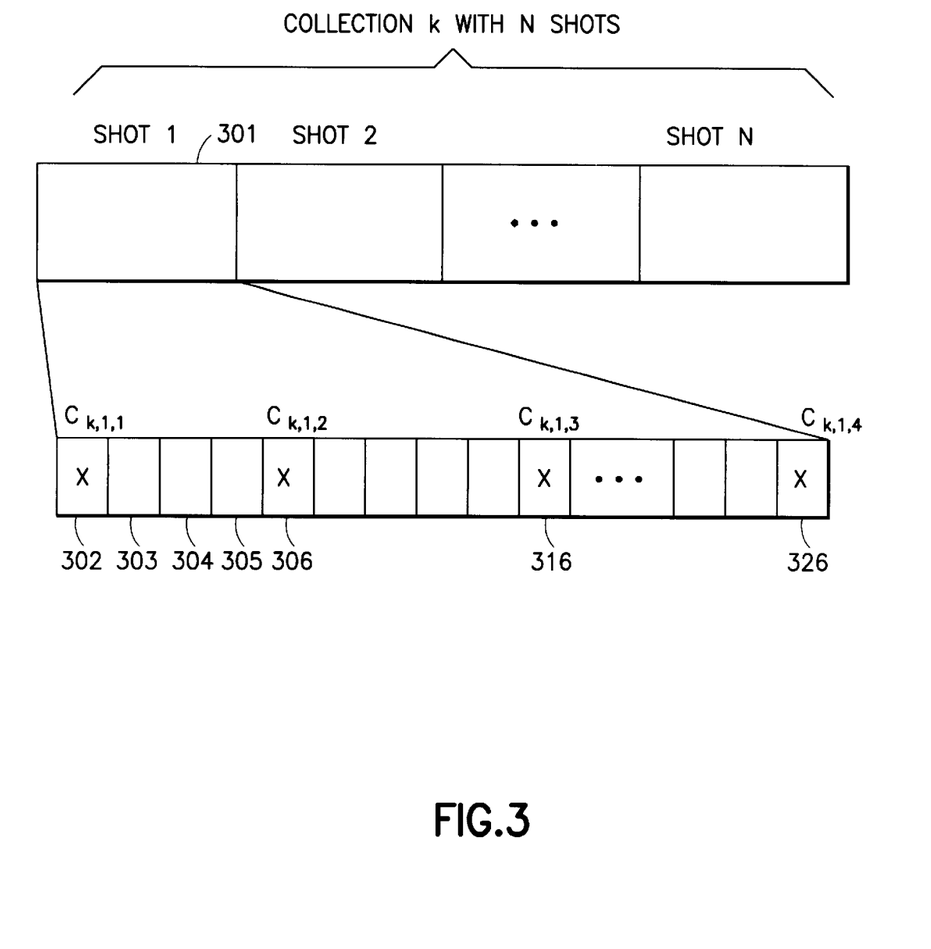
FIG. 3 is a block diagram of a collection with two or more shots, each shot having one or more selected frames.

FIG. 3 is a block diagram of collection k with N shots, typically 301. Each shot has one or more frames (typically 302–306, 316, 326), where frames 302, 306, 316, and 326 are selected frames (and 303–306 are unselected frames). The selected frames (e.g., 302) are selected by the selection process 400. The content of 301 (shot 1) is shown in detail—302 is the first frame of shot 1; 303 is the second frame of shot 1, and so on. As shown in FIG. 3, shot 1 has 4 selected frames, each of which is marked by 'X'. The selected frames for this shot are denoted by $C_{k,1,1}$, $C_{k,1,2}$, $C_{k,1,3}$ and $C_{k,1,4}$. In a similar manner, the selected frame of shot 1 is denoted by $C_{k,1,1}$, $C_{k,1,2}$, ... The general notation $C_{a,b,b}$ is as follows: a is the collection number, b is the shot number within this collection, and c is the selected frame number within this shot.

FIG. 4 (a) is a flow chart of one preferred selection process 400 that selects frames for each shot in a collection k. The selection begins with choosing 401 a first shot (e.g. 301) and then choosing 402 a first frame (e.g. 302) of the first shot 301 and comparing subsequent frames of the first shot to the first frame, where the sequence is taken continuously (either increasing or decreasing in time.) That is, the subsequent frames of the shot that are compared to the first frame are taken sequential in increasing (decreasing) order with respect to time. If one of the subsequent frames is different from the first frame by more than a threshold, that frame is selected, becomes the first frame 403 and the process 400 is repeated for all of the frames and shots (404 and 405). This threshold is measured as an intensity difference between the compared shots (below.) As stated, the frames can alternatively be traversed in decreasing time order, instead of increasing time order, for the selection (of the subset of frames of the shot).

The difference (threshold) between two frames, $d(f_1,f_2)$, is based on intensity or other properties or intensity related measurements. Examples include histogram and pixel differences, described in Yeo and Liu (B. L. Yeo and B. Liu, "Rapid Scene Analysis from Compressed Video", IEEE Transactions on Circuits and Systems for Video Technology, Vol. 5, No. 6, pp. 533–544, December 1995.) This reference is incorporated by reference in its entirety.

In an alternative embodiment, computation time can be saved by comparing the frames with spatially reduced resolution. For example, frames having a spatial resolution of 352 by 240 pixels can be compared after their resolution has been reduced to 44 by 30 pixels. This technique of generating reduced resolution images from compressed video is described in Yeo and Liu (B. L. Yeo and B. Liu, "On the extraction of DC sequences from MPEG compressed video", International Conference on Image Processing, Vol. II, pp. 260–263, 1995.) This reference is incorporated by reference in its entirety.

The output from 405 for the first shot is a list of selected frames, named $C_{k,1,j}$, j=1, 2, . . . . This set, $C_{k,1,j}$, j=1, 2, . . . , is the subset of the shot. In general, the output of the process in selecting the frames for the i th shot is $C_{k,i,j}$, j=1, 2, . . . . These $C_{k,f,j}$ are exactly those marked with 'X' in FIG. 3, and they are the frames that represent the shot i and collection k.

As stated above, the number of frames in the subset might need to be further reduced because of system resource limitations. In these cases, the subset of frames $C_{k,i,j}$ is determined, as before, by the threshold ε. Afterwards, a further selection step (406) is taken in which the number of selected frames (the second subset) is reduced. In this case, the user is presented with less information (few frames in the second subset) but is using fewer system resources, e.g. bandwidth. The selection of this second subset is described further in the description of FIG. 4(b).

The selected frames can then be optionally interleaved (407), stored (408), and/or transmitted (409). At a client computer, the selected frames are received (410) and dynamically displayed (411), as shown in FIG. 2 (a), 2 (b) and 2 (c). The communication (409, 410) and some display (411) methods of these frames is well known.

Denoting the frames selected by 401 through 405 as $C_{k,i,1}$, $C_{k,i,2}$, . . . , $C_{k,i,n}$ (i.e., n frames are selected for shot i in collection k) we can further select a subset, a second subset, of m, m<n, frames from this set. In this case, select m frames are selected from n frames such that adjacent selected frames in time are approximately separated by the same threshold.

Figure 4B:
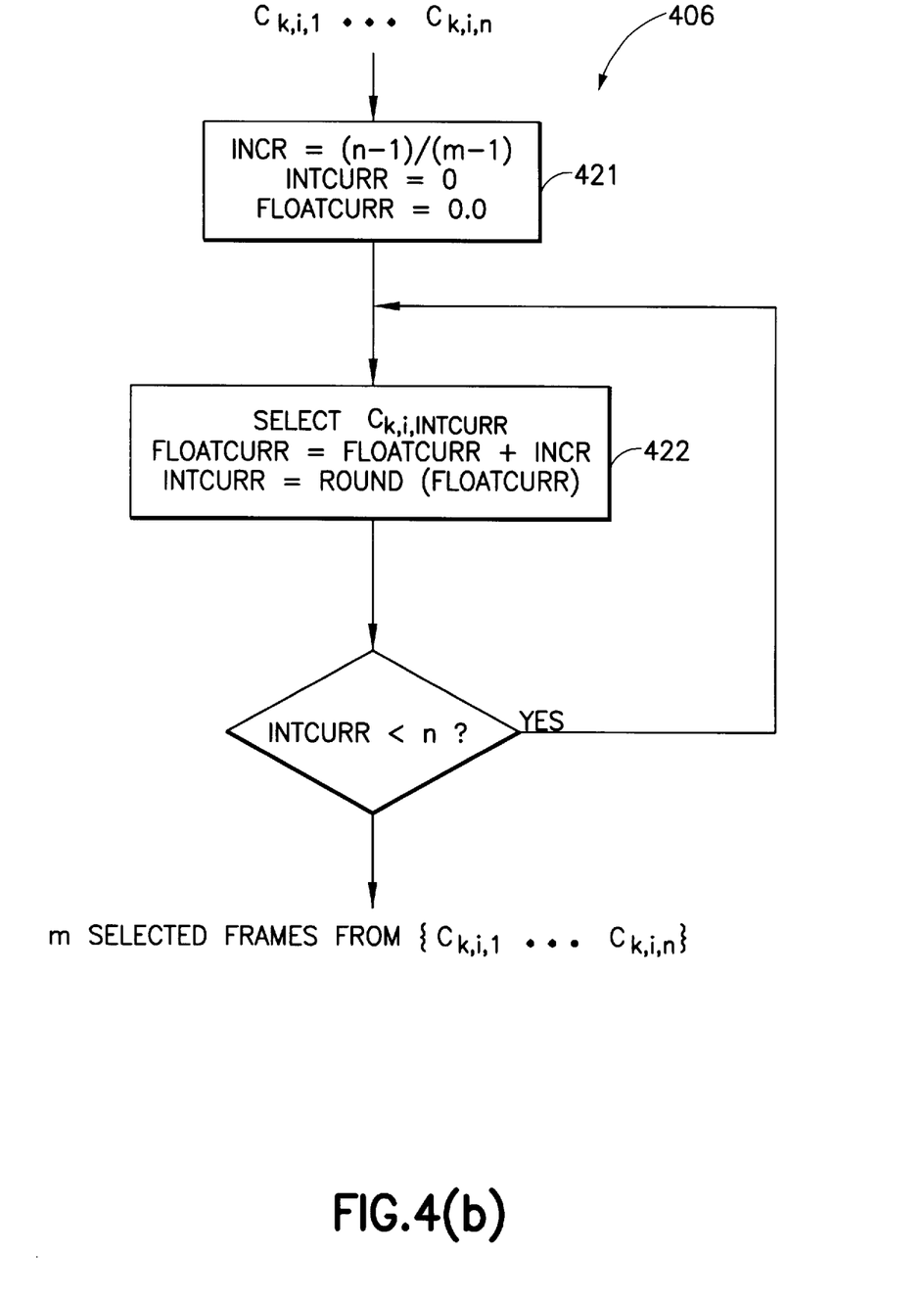
Figure 4C:
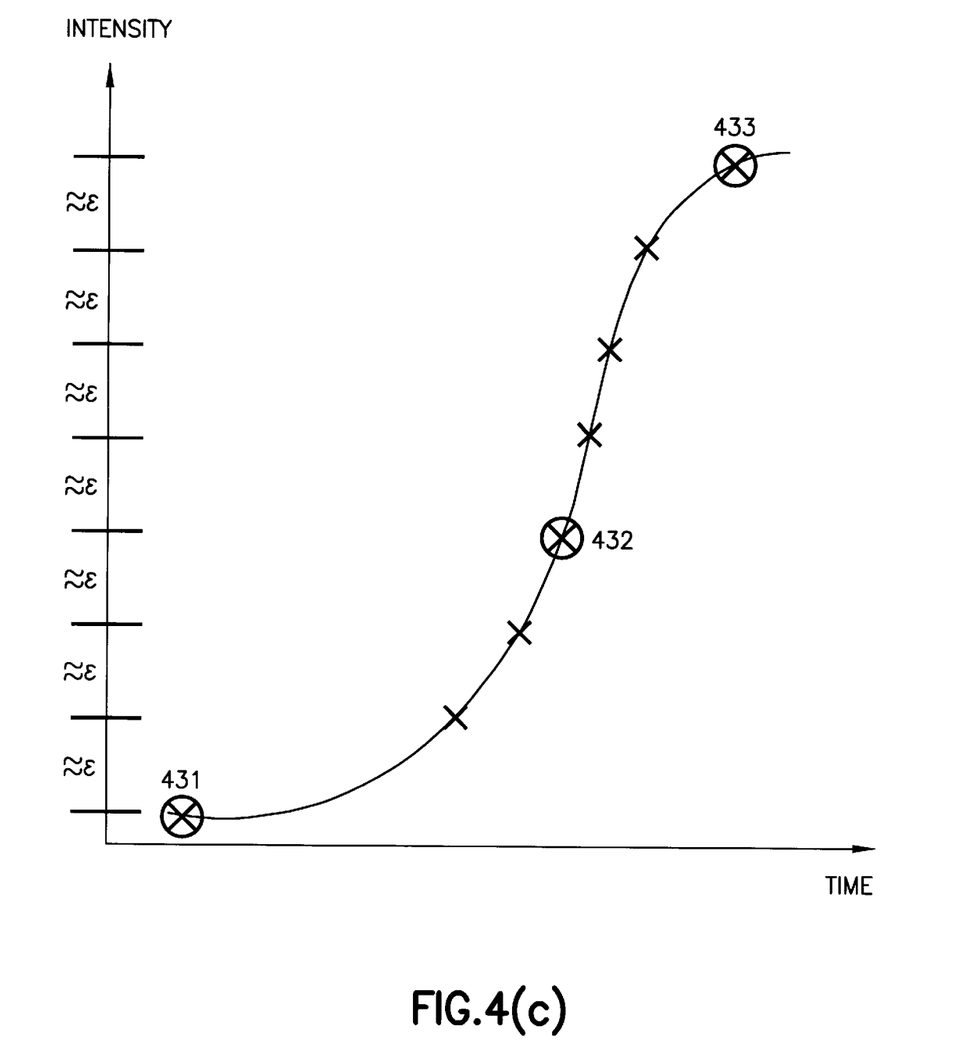

In the selection process 403, a pair of two adjacent selected frames $C_{k,i,j}$ and $C_{k,i,j+1}$ have a difference of greater than ε. Because the selection is performed within a shot, the difference between every adjacent pair of selected frames in the shot is roughly the same. The selection of m frames from n such frames can then be based on uniformly selecting (see below) these n frames, without needing to perform another difference operations. This selection process is useful when there is constraints in resources such as the number of frames to be stored or transmitted for each shot. The algorithm is shown in FIG. 4 (b). The input is a list of n frames $C_{k,i,1}$, $C_{k,i,2}$, . . . , $C_{k,i,n}$. Step 421 initializes the algorithm to further select a second subset of m frames from this n frames, where m<n. The variable IntCurr will denote the frame to select. At each step of the iteration (422), $C_{k,i,IntCurr}$ is selected and IntCurr is appropriately incremented. The increment by IntCurr at each step of the iteration further selects frames from $C_{k,i,1}$, $C_{k,i,2}$, . . . , $C_{k,i,n}$ such that adjacent frames in the further selected second set differ from each other by a multiple of the intensity threshold within an intensity tolerance. There is thus a tradeoff between the difference in content between adjacent frames and the resources in terms of storage or bandwidth needed to store or transmit these frames.

An analogy of the further selection process in a one-dimensional example is shown in FIG. 4 (c). Here, the one-dimensional graph is analogous to a sequence of video shots. The horizontal axis denotes time and the vertical axis denotes the intensity. The points marked 'X' are selected, analogous to those frames selected by the proposed selected process. The vertical distances between adjacent 'X's are approximately the same, i.e., ε, which is the intensity threshold used in 400. The further selection step then further selects m points from the set of n points such that the vertical distances between adjacent further-selected points are approximately equal. This is precisely what 406 achieves. In this figure, 3 points (431, 432 and 433) are further selected and they are further marked with 'o'. The separations between adjacent (further) selected points are now approximately constant. We can also view the separation between 431 and 432 as approximately 3 δ and the separation between 432 and 433 as approximately 4 ε. Thus, each frame selected by the further selection process differs from an adjacent member of the subset resulting from the further selection process by a multiple of the intensity threshold within an intensity tolerance.

FIG. 4 (d) shows an example of the results of the further selection process, of step in FIG. 4 (b). In this example, 8 frames are selected after the selection process, i.e. by the selection process 401–405. Suppose due to storage or bandwidth constraint, it is desired to further select only 3 frames on this set. The algorithm selects frame 1, 4 and 8. This process of further selection is a key component of this invention and is very useful for selecting a smaller subset of fixed number of frames for storage and transmission to meet resource constraints such as bandwidth, storage or delay. Furthermore, the further selection process 406 can be used for interleaving, to be discussed below, to order selected frames for transmission process.

Figure 4D:
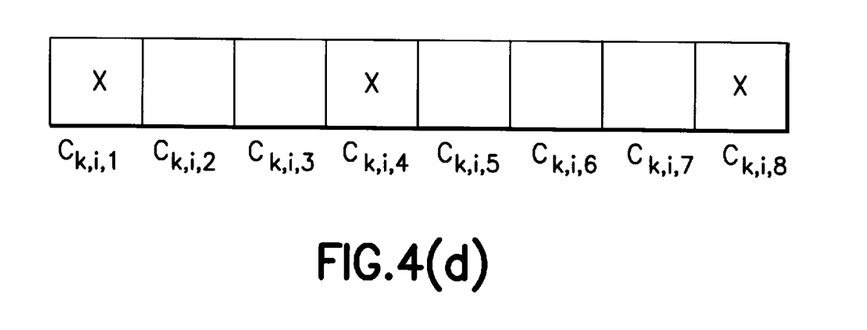
Figure 4E:
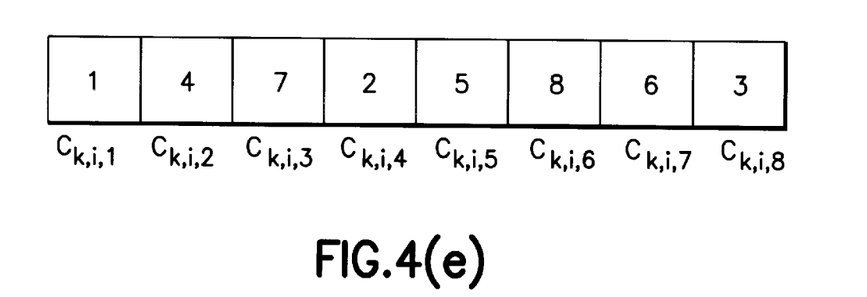

An alternative to 406 is to select frames from the selected set of frames such that the further selected frames are uniformly spaced apart. For example, in FIG. 4 (d), we could select instead of 1, 4 and 8, frames 1, 4, and 7. The method is simpler than 406 but does not guarantee that the first and last frames are always selected, which is the case with the method of 406.

We shall use $C_{k,i,j}$ for the rest of the description to denote the set of selected frames for collection k, shot i. They could be a result of the selection steps 401–405 or from the further selection 406.

Figure 5:
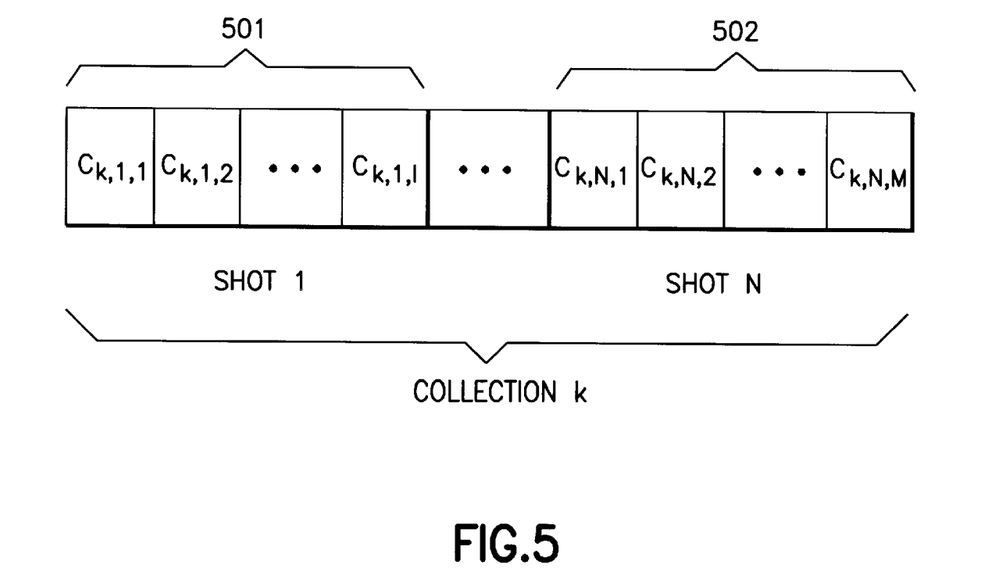
FIG. 5 is a block diagram of a memory structure of one preferred embodiment of a plurality of shots with selected subsets of frames.

After the selection process through all the collections, the selected frames $C_{k,i,j}$ are stored for later use (405, see FIG. 5). There are several ways that the selected frames are stored. For example, the frames can be stored in the order in which they are selected. The frames can be further interleaved (407) before storage.

Interleaving is advantageous in transmission purposes (409), in which successively more frames are sent to convey the sense of dynamics of the content.

Interleaving can be achieved using a succession of the further selection algorithm in FIG. 4 (b). At the shot level, interleaving can be performed such that the frames are re-ordered to ensure maximal difference between the adjacent reordered frames. FIG. 4 (e) shows the result of an interleaving process that reorders 8 selected frames. Thus, after the interleaving process, $C_{k,i,1}$ will be stored, then $C_{k,i,4}$, then $C_{k,i,8}$, then $C_{k,i,2}$ and so on. $C_{k,i,1}$ will be adjacently stored to $C_{k,i,4}$ even though they are not adjacent before the interleaving. Such interleaving process can also be seen as a grouping of frames such that frames within each group differ in intensity from an adjacent member of the group by approximately the same amount (preferrable a multiple of the threshold). In this figure, there are three groups: the first group consists of $C_{k,i,1}$, $C_{k,i,4}$ and $C_{k,i,8}$; the second group consists of $C_{k,i,2}$, $C_{k,i,5}$ and $C_{k,i,7}$; the third group consists of $C_{k,i,3}$ and $C_{k,i,6}$. (Note that the numbers in the boxes in FIG. 4 (e) are the order of the interleaving selection of frames.) In the first group, $C_{k,i,1}$ differs from $C_{k,i,4}$ by about 3 ε and $C_{k,i,4}$ differs $C_{k,i,8}$ by about 4 ε. In the second group, $C_{k,i,2}$ differs $C_{k,i,5}$ by about 3 $\epsilon$ and $C_{k,i,5}$ differs $C_{k,i,7}$ by about 2 $\epsilon$. In a preferred embodiment, a succession of the further selection process (406) is applied with m=3. Process 406 selects both the first and the last frame. Further, using m=3 means that at each iteration, the median frame is also selected from the remaining set.

Figure 7:
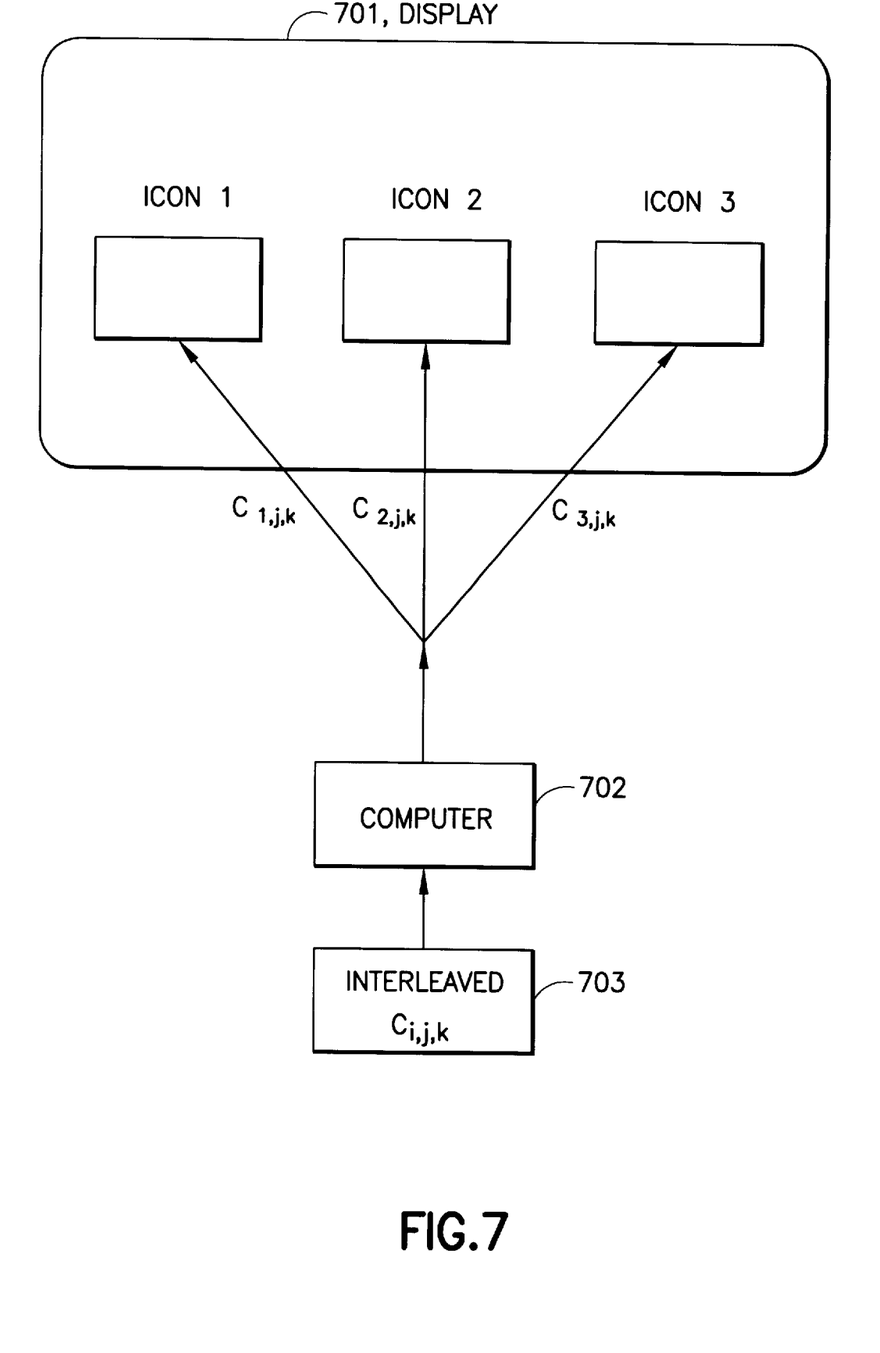
FIG. 7 is a flow chart of a browser process executing on a workstation or a client on a network.

At the client computer which receives the frames over a network (process 410), multiple icons are displayed to animate the content of each collection (process 411, see FIG. 7). The animation conveys a sense of the dynamic of each video collection.

After the selection of frames from shots in collections, the frames can be stored (408) separately for more efficient access. FIG. 5 is a block diagram of a memory/disk structure of one preferred embodiment of a plurality of collection of shots with selected subsets of frames. The figure depicts collection k with N shots. Shot 1 (501) consists of L selected frames, numbered $C_{k,1,1}$ through $C_{k,1,L}$. Shot N (502) consists of M selected frames, numbered $C_{k,N,1}$ through $C_{k,N,M}$.

Figure 6A:
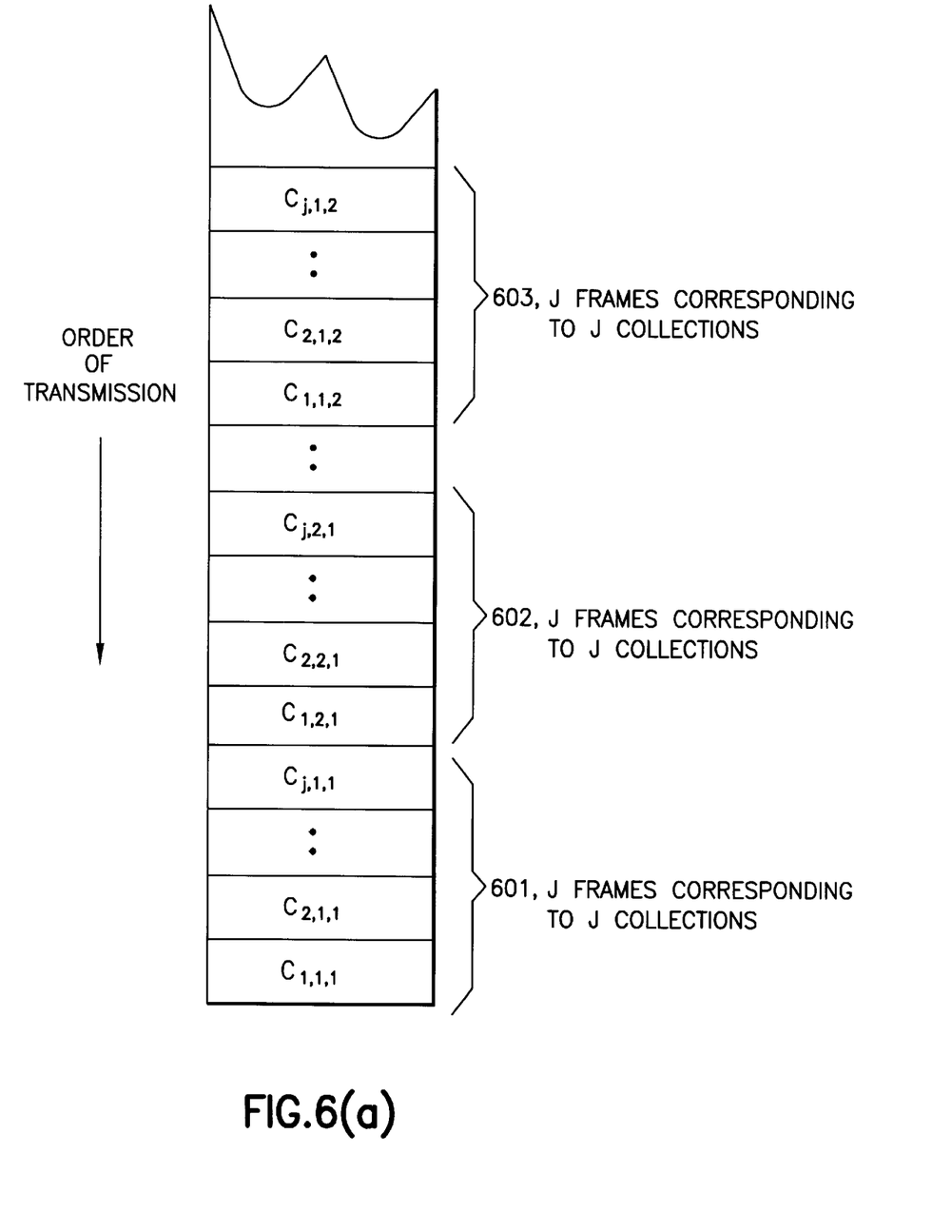

During transmission, it is desirable that to interleave the frames from collection. FIG. 6 (a) shows one preferred network packet that is transmitted over the network by the server in a transmitted interleaved order. Here, there are J collections. 601 consists of J frames, each one from a different shot in a different collection. In 601, for the first collection, the first frame from the first shot is used; similarly, for the second and subsequent collection, the first frames from the first shots are used. Thus, the first J frames sent are $C_{1,1,1}, C_{2,1,1}, \ldots, C_{J,1,1}$. The next J frames form 602. In 602, the first frame from the second shot of the first collection is sent; similarly, for the remaining collections, the first frame from the second shot of each collection is sent. The process is iterated for each subsequent set of J frames transmitted. After iterating through all the shots in each collections, the first shot is re-visited and the second selected frame is then transmitted. This is the case in 603, where for each collection, the second selected frame of the first shot (i.e., $C_{k,1,2}$) is transmitted. The general principle to select the frame is thus as follows: for each collection, select the next shot, and for each shot, select the next frame for transmission. The selected frames for each collections for each timestep are then transmitted together.

Figure 6B:
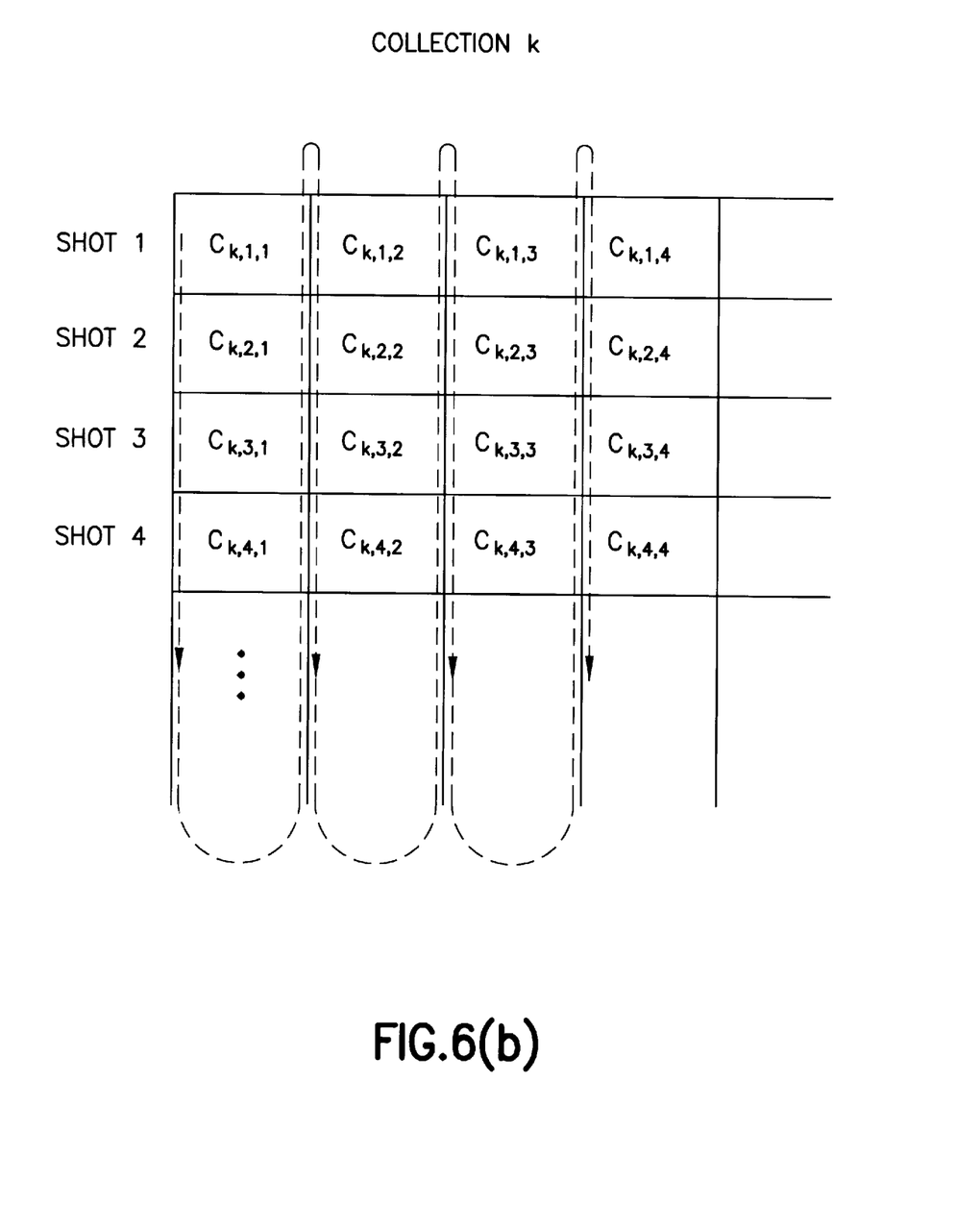

FIG. 6 (b) shows a preferred way to select the next frame from a collection for transmission. The selected frames for each shot in a collection is laid out in row order. A table is then formed from all the rows. The selection process then traverses the table in column order, as shown. Thus, at the first pass, the first frame selected for collection k is the first frame of the first shot, i.e., $C_{k,1,1}$; the second frame is the first frame of the second shot, i.e., $C_{k,2,1}$, and so on. After all the first frames of the shots are transmitted, the second frame of the first shot, i.e., $C_{k,1,2}$, is sent, followed by the second frame of the second shot and so on. This process transmits frames in the order shown in FIG. 6 (a). The pseudo-code for transmitting frames in collection k is as follows:

For $i$ = 1, 2, 3, . . . do

For $j$ = 1, 2, 3, . . . do

Transmit $C_{k,j,i}$

At the receiving end, the interleaved collection of frames will be mapped to the respective image icon on the display.

FIG. 7 depicts a typical scenario. The computer 702 reads in an interleaved sequence of frames $C_{i,j,k}$ 703. Frame $C_{i,j,k}$ will then be displayed as icon i on display 701. The pseudo-code for mapping received sequences to icons is as follows:

Set up $i$ icons on screen.

While (Next Icon Received = $C_{l,j,k}$)

Update Icon $l$ with $C_{l,j,k}$

Alternatively, the update for the i icons can be performed simultaneously, i.e.,     Set up $i$ icons on screen.

While (Next $i$ Icons Received = $C_{1,j,k}, C_{2,j,k}, \ldots, C_{i,j,k}$)

Update Icons 1, 2, . . . , $i$ with $C_{1,j,k}, C_{2,j,k}, \ldots, C_{i,j,k}$ The intervals between successive update between two different images for the same icons, will depend on the bandwidth availability or some preset threshold. The dynamic display of an icon through the alternations between frames of each shot in a collection then provides a visual cues of the dynamics present in the aggregate of shots in that collection.

Given this disclosure alternative equivalent embodiments will become apparent to those skilled in the art. These embodiments are also within the contemplation of the inventors.

I claim:

1. A computer system comprising:
   a memory storage containing one or more multimedia collections, each of the collections having one or more multimedia shots, each of the shots having one or more frames;
   a selection process that selects a subset of one or more of the frames by traversing the frames of each of one or more of the shots in a time direction, any pair of adjacent frames in the subset having an intensity difference that is the same as the intensity difference between any other pair of adjacent frames in the subset, within a tolerance; and
   a second selection process that selects a second subset of frames from the subset to satisfy a resource constraint.

2. A system, as in claim 1, where the resource constraint limits the total number of frames in the second subset.

3. A system, as in claim 2, where the constraint is any one or more of the following: a user response, a lack of user response, a bandwidth limitation, and a storage limitation.

4. A system, as in claim 2, where each of the adjacent frames in the second subset differs in intensity multiple of the intensity threshold within a second tolerance.

5. A system, as in claim 1, where the direction is any one of increasing time and decreasing time.

6. A system, as in claim 1, where the intensity difference is determined by any one of the following: a pixel to pixel comparison and a histogram differencing between frames.

7. A system, as in claim 1, where the selection process further stores the selected frames in an order.

8. A system, as in claim 7, where the order is the order of selection as the frame is traversed in the time direction.

9. A system, as in claim 7, where the order is an interleaved order, the interleaving order adjacently storing one or more of the frames that are not adjacent in the order of selection as the frame is traversed in the time direction.

10. A system, as in claim 9, where the interleaving process groups frames of the subset of frames into one or more groups so each of the members of the group differ in intensity from an adjacent member of the group by a multiple of the intensity threshold within an intensity tolerance.

11. A system, as in claim 7, in which the stored frames from all the collections are transmitted in the order.

12. A system, as in claim 7, in which the stored frames from all the collections are transmitted in the transmitted interleaved order.

13. A system, as in claim 12, in which the transmitted interleaved order is transmitted at least one frame from each shot in the collection before transmitting a next frame from any shot in the collection.

14. A system, as in claim 12, in which the transmitted interleaved order is transmitted at least one frame from each collection before transmitting a next frame from any other collection.

15. A system, as in claim 14, where the transmitted interleaved order transmits at least one frame from each shot in the collection before transmitting a next frame from any shot in the collection.

16. A system, as in claim 1, having a receiver with a display, the display having one or more icons and the the selected frames of each collection are displayed in one of the icons simultaneously with the selected frames of one or more of the other collections.

17. A method comprising the steps of:
   a. traversing a plurality of frames of one or more shots in one or more collections of shots in a time direction;
   b. choosing one or more of the frames as a chosen frame;
   c. determining an intensity difference between the intensity of the chosen frame and a selected frame, the selected frame being the last frame selected during the traversing;
   d. if the intensity difference is greater than an intensity threshold, selecting the chosen frame as a member of a set of selected frames and replacing the selected frame with the chosen frame;
   e. repeating steps b–d for all of the frames in the collections; and
   f. further selecting a subset of frames from the set of selected frames where the frames in the subset of frames satisfy a constraint.

18. A method, as in claim 17, further comprising the step of:
   g. storing the subset of frames in an interleaved order, where the order is an interleaved order, the interleaving order adjacently storing one or more of the frames that are not adjacent in the order of selection as the frame is traversed in the time direction.

19. A method, as in claim 18, further comprising the step of:
   h. displaying one or more icons, the selected frames of each collection being displayed in one of the icons simultaneously with the selected frames of one or more of the other collections.

20. A computer system comprising:
   a memory storage means for containing one or more multimedia collections, each of the collections having one or more multimedia shots, each of the shots having one or more frames;
   a selection process for selecting one or more of the frames as selected frames and deselecting one or more of the frames as deselected frames by traversing the frames of each of one or more of the shots in a time direction, an intensity difference being the difference in intensity between one of the deselected frames and a recent selected frame that is one of the selected frames that is last selected in the time direction, the intensity difference of the deselected frames being less than an intensity threshold; and
   a second selection process that selects a second subset of frames from the subset to satisfy a resource constraint.

* * * * *